(12) United States Patent
Jurik et al.

(10) Patent No.: US 10,520,176 B2
(45) Date of Patent: Dec. 31, 2019

(54) AUTOMATED SCRIM SYSTEM FOR A LUMINAIRE

(71) Applicant: Robe Lighting s.r.o., Roznov pod Radhostem (CZ)

(72) Inventors: Pavel Jurik, Prostredni Becva (CZ); Josef Valchar, Prostredni Becva (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 16/283,409

(22) Filed: Feb. 22, 2019

(65) Prior Publication Data

US 2019/0186721 A1 Jun. 20, 2019

Related U.S. Application Data

(63) Continuation of application No. 15/516,400, filed as application No. PCT/US2015/053568 on Oct. 1, 2015, now Pat. No. 10,295,160.

(Continued)

(51) Int. Cl.
| | |
|---|---|
| *F21V 21/00* | (2006.01) |
| *F21V 21/15* | (2006.01) |
| *G02B 19/00* | (2006.01) |
| *G02B 27/09* | (2006.01) |
| *G02B 6/00* | (2006.01) |

(Continued)

(52) U.S. Cl.
CPC ............... *F21V 21/15* (2013.01); *F21K 9/62* (2016.08); *F21S 10/007* (2013.01); *F21V 5/04* (2013.01); *F21V 9/08* (2013.01); *F21V 14/08* (2013.01); *G02B 6/00* (2013.01); *G02B 19/0028* (2013.01); *G02B 19/0066* (2013.01); *G02B 27/0927* (2013.01); *G02B 27/0994* (2013.01); *F21Y 2113/13* (2016.08); *F21Y 2115/10* (2016.08)

(58) Field of Classification Search
CPC ... F21V 21/15; F21V 5/04; F21V 9/08; F21V 14/08; F21S 10/007; F21K 9/62; G02B 6/00; G02B 19/0028; G02B 19/0066; G02B 27/0927; G02B 27/0994
USPC ....................................................... 362/284
See application file for complete search history.

(56) References Cited

U.S. PATENT DOCUMENTS

| | | | |
|---|---|---|---|
| 917,368 A | * 4/1909 | Seidel | ..................... F21S 10/02 362/319 |
| 4,037,097 A | 7/1977 | Stillman et al. | |

(Continued)

FOREIGN PATENT DOCUMENTS

DE 202006007227 U1 7/2006

OTHER PUBLICATIONS

Office Action dated Jun. 13, 2018; U.S. Appl. No. 15/516,400, filed Apr. 1, 2017; 14 pages.

(Continued)

*Primary Examiner* — Laura K Tso
(74) *Attorney, Agent, or Firm* — Conley Rose, P.C.; Grant Rodolph; Brooks W Taylor

(57) ABSTRACT

A scrim system and automated luminaire are provided. The automated luminaire includes a light source, a scrim system, and control electronics. The scrim system moves a scrim into a light beam received from the light source and rotates the scrim. The control electronics control the scrim system to move the scrim a selected distance into the light beam and to rotate the scrim independently to a selected angle relative to the light beam.

20 Claims, 4 Drawing Sheets

Related U.S. Application Data

(60) Provisional application No. 62/058,566, filed on Oct. 1, 2014.

(51) Int. Cl.
| | | |
|---|---|---|
| *F21S 10/00* | (2006.01) | |
| *F21K 9/62* | (2016.01) | |
| *F21V 5/04* | (2006.01) | |
| *F21V 9/08* | (2018.01) | |
| *F21V 14/08* | (2006.01) | |
| *F21Y 115/10* | (2016.01) | |
| *F21Y 113/13* | (2016.01) | |

(56) References Cited

U.S. PATENT DOCUMENTS

| | | | |
|---|---|---|---|
| 4,179,726 A | 12/1979 | Aron | |
| 4,468,720 A | 8/1984 | Arai | |
| 4,777,566 A | 10/1988 | Lowell et al. | |
| 5,371,655 A | 12/1994 | Murdock et al. | |
| 5,513,083 A | 4/1996 | Chang | |
| 5,515,119 A | 5/1996 | Murdock et al. | |
| 5,758,955 A | 6/1998 | Belliveau | |
| 6,079,853 A | 6/2000 | Evans | |
| 7,537,360 B2 * | 5/2009 | Allegri | F21S 10/02 362/319 |
| 7,736,037 B2 | 6/2010 | Losak et al. | |
| 7,862,208 B2 * | 1/2011 | Melzner | F21V 11/00 362/279 |
| 8,002,439 B2 * | 8/2011 | Cavenati | F21V 5/008 362/268 |
| 2004/0125602 A1 | 7/2004 | Hunt et al. | |
| 2006/0176696 A1 | 8/2006 | Hough | |
| 2009/0073696 A1 | 3/2009 | Melzner | |
| 2009/0323345 A1 | 12/2009 | Bornhorst | |
| 2015/0070905 A1 | 3/2015 | Dalsgaard et al. | |
| 2018/0180268 A1 | 6/2018 | Jurik et al. | |

OTHER PUBLICATIONS

Final Office Action dated Nov. 14, 2018; U.S. Appl. No. 15/516,400, filed Apr. 1, 2017; 17 pages.

Notice of Allowance dated Jan. 29, 2019; U.S. Appl. No. 15/516,400, filed Apr. 1, 2017; 7 pages.

PCT International Search Report, Application No. PCT/US2015/053568; dated Mar. 16, 2016; 5 pages.

PCT Written Opinion of the International Searching Authority; Application No. PCT/US2015/053568; dated Mar. 16, 2016; 6 pages.

European Examination Report; Application No. 15820915.5; dated Jul. 26, 2018; 6 pages.

European Examination Report; Application No. 15820915.5; dated Jul. 24, 2019; 6 pages.

\* cited by examiner

AUTOMATED SCRIM SYSTEM FOR A LUMINAIRE

CROSS-REFERENCE TO RELATED APPLICATIONS

This application is a continuation of U.S. patent application Ser. No. 15/516,400 filed Apr. 1, 2017 by Pavel Jurik, et al. entitled, "An Automated Scrim System for a Luminaire", which is a National Stage of International Patent Application No. PCT/US2015/053568 filed Oct. 1, 2015 by Pavel Jurik, et al. entitled, "An Automated Scrim System for a Luminaire", which claims priority to U.S. Provisional Application No. 62/058,566 filed Oct. 1, 2014 by Pavel Jurik, et al. entitled, "Automated Scrim System for a Luminaire", all of which are incorporated by reference herein as if reproduced in their entirety.

TECHNICAL FIELD OF THE DISCLOSURE

The present disclosure generally relates to an automated scrim system, specifically to an adjustable scrim system for use within an automated luminaire.

BACKGROUND OF THE DISCLOSURE

Luminaires with automated and remotely controllable functionality are well known in the entertainment and architectural lighting markets. Such products are commonly used in theatres, television studios, concerts, theme parks, night clubs and other venues. A typical product will commonly provide control over the pan and tilt functions of the luminaire allowing the operator to control the direction the luminaire is pointing and thus the position of the light beam on the stage or in the studio. Typically this position control is done via control of the luminaire's position in two orthogonal rotational axes usually referred to as pan and tilt. Many products provide control over other parameters such as the intensity, color, focus, beam size, beam shape, beam framing, and beam pattern. The luminaire may be capable of producing a diffused, non-imaging, field of light, often called a wash luminaire, or may be capable of producing a defined image in the light beam, often called a spot luminaire. Other products may be capable of both wash and spot operation. The products manufactured by Robe Show Lighting are typical of the art.

The optical systems of such luminaires may include a gate or aperture through which the light is constrained to pass. Mounted in or near this gate may be devices such as gobos, patterns, irises, color filters or other beam modifying devices as known in the art. The use of a framing shutter system at this point allows control over the size and shape of the output beam and thus the size and shape of the image projected onto a surface.

FIG. 1 illustrates an example of a prior art multiparameter automated luminaire system 10. These systems commonly include a plurality of multiparameter automated luminaires 12 which typically each contain on-board a light source (not shown), light modulation devices, electric motors coupled to mechanical drive systems and control electronics (not shown). In addition to being connected to mains power either directly or through a power distribution system (not shown), each automated luminaire 12 is connected is series or in parallel to data link 14 to one or more control desks 15. The automated luminaire system 10 is typically controlled by an operator through the control desk 15.

Although many of the lighting controls and effects available to conventional, non-automated, luminaires have been adapted for use with fully automated units, the use of a scrim, or half-scrim, has not so far been offered to the users of automated luminaires. A scrim, as used in conventional luminaires, is a means for adjusting the intensity of portions of a light beam in a selective manner. In some prior art luminaires it comprises a fine metal mesh screen that is placed on the front of a luminaire to act as a dimmer. The position of the mesh may be adjusted so as to selectively dim portions of the output light beam, while leaving other areas unaffected. Similarly, the density of the mesh may be chosen based on the amount of light dimming produced. Scrims are also available in the prior art for conventional luminaires such that only half of the output beam is screened, therefore allowing for only a portion of the light beam to be dimmed. This allows the operator to selectively control the light level across a light beam as well as control the overall intensity using a normal dimmer.

A scrim in a conventional luminaire may be used to grade the light output across a cyclorama in a theatre, or in a television or film studio, to modulate the light intensity across two or more performers. For example, it is very common in television lighting to have two performers in a single shot such as in an interview or talk show situation. In those circumstances there will likely be two crossing key lights, one lighting the face of each performer. A side effect of such a lighting set up is that the key light for the face of performer A will also illuminate the back of the head of performer B, and vice versa. To reduce this unwanted illumination of the backs of the performer's heads, each of the two crossing key lights may be fitted with a scrim in the lower half of the beam to reduce the intensity of the light beams solely in the areas where they illuminate the wrong performer while retaining the intensity of the light beam in the area where it illuminates the face of the intended performer.

Such functionality has not been available in automated luminaires; however, automated luminaires are increasingly used in these areas of lighting. Thus, there is a need for a controllable scrim system for an automated luminaire which provides the user with both accurate positioning and the ability for rapid movement.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE DISCLOSURE

Preferred embodiments of the present disclosure are illustrated in the FIGUREs, like numerals being used to refer to like and corresponding parts of the various drawings.

The present disclosure generally relates to an automated scrim system, specifically to an adjustable scrim system for use within an automated luminaire.

Figure 1:
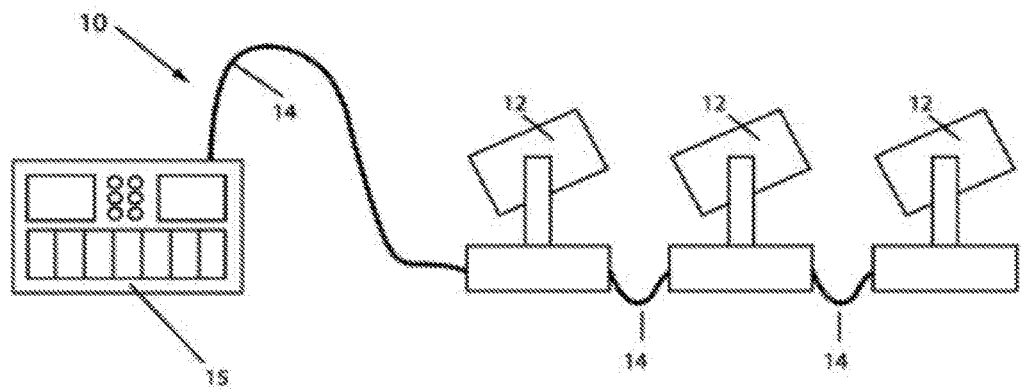
FIG. 1 illustrates a typical automated lighting system.
Figure 2:
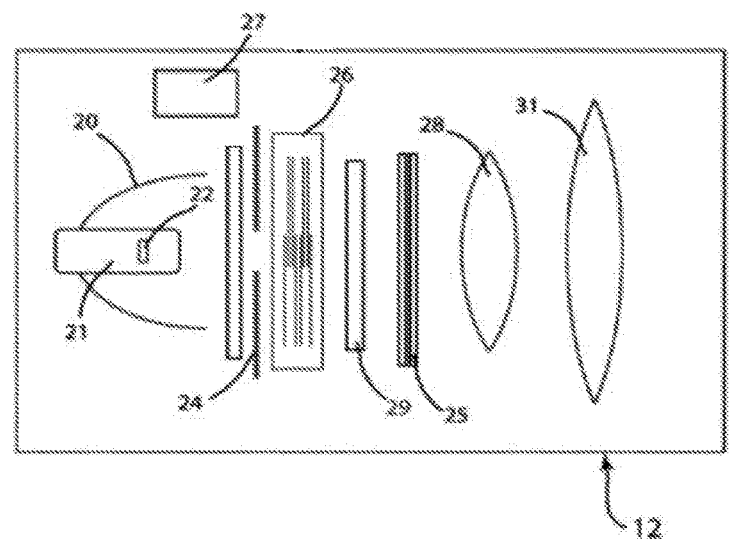
FIG. 2 illustrates an embodiment of the disclosure as it may be installed in a spot, imaging type, automated luminaire.

FIG. 2 illustrates an embodiment of the disclosure as it may be installed in a spot, imaging type, automated luminaire 12. A lamp 21 contains a light source 22 that emits light. The light source 22 may have a power supply 27. The light is reflected and controlled by reflector 20 through an aperture or imaging gate 24, color control systems 26, and imaging systems 29, and then through an adjustable scrim system 25. Color control systems 26 and imaging systems 29 may include dichroic color filters, gobos, rotating gobos, variable aperture irises, effects glass, framing systems, and other optical devices well known in the art. The final output beam may be transmitted through output lenses 28 and 31 that may form a zoom lens system. In this embodiment, the automated adjustable scrim system 25 is shown after all optical effects, but prior to the output lenses 28 and 31. However, the position of the adjustable scrim system 25 is not so constrained and it may be positioned anywhere in the optical train as desired. In particular, it may be positioned at the output of the automated luminaire 12, after all lenses, as is typically done with prior art conventional luminaires. In normal use the adjustable scrim system 25 would be positioned after all rotating effects such that the selective dimming caused by the scrim is not altered by the rotation of such effects.

Figure 3:
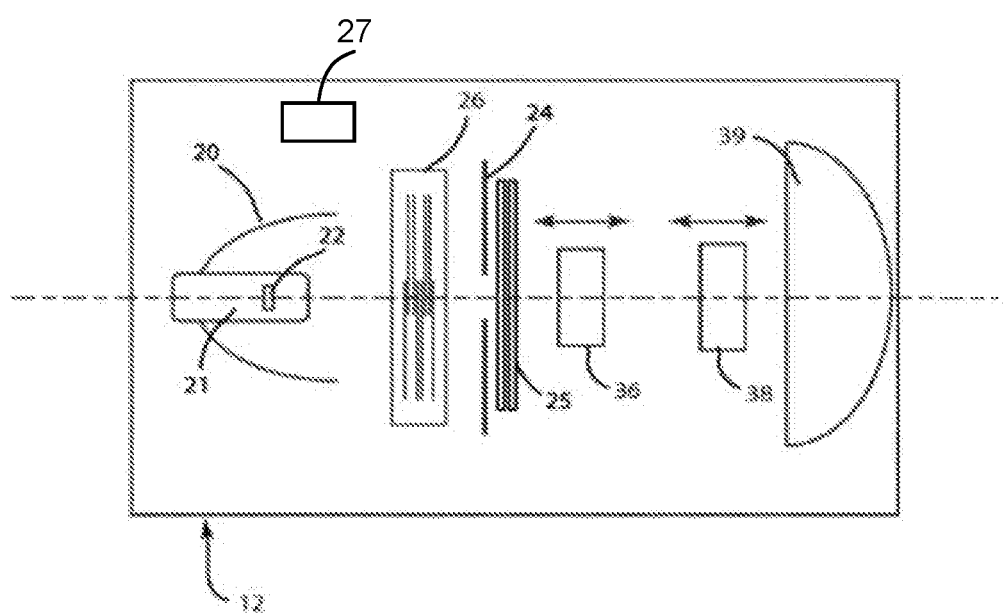
FIG. 3 illustrates an embodiment of the disclosure as it may be installed in a wash, non-imaging type, automated luminaire.

FIG. 3 illustrates an embodiment of the disclosure as it may be installed in a wash, non-imaging type, automated luminaire 12. A lamp 21 contains a light source 22 that emits light that may have a power supply 27. The light is reflected and controlled by reflector 20 through color control systems 26, aperture 24, and then through an adjustable scrim system 25. Color control systems 26 may include dichroic color filters, effects glass, soft-edge framing systems, and other optical devices well known in the art. The final output beam may be transmitted through output lenses 36, 38, and 39 that may form a zoom lens system. In this embodiment, the automated adjustable scrim system 25 is shown after all optical effects, but prior to the output lenses 36, 38, and 39. However, the position of the adjustable scrim system 25 is not so constrained and it may be positioned anywhere in the optical train as desired. In particular it may be positioned at the output of the automated luminaire 12, after all lenses, as is typically done with prior art conventional luminaires. In normal use the adjustable scrim system 25 would be positioned after all rotating effects such that the selective dimming caused by the scrim is not altered by the rotation of such effects.

FIG. 4 illustrates schematically the operation of an embodiment of the disclosure. Optical aperture (or light beam) 40 indicates a cross section of the light beam at some point in the automated luminaire. Scrim 42 may be moved, as shown by arrow 44, from outside the light beam to across the light beam. Scrim 42 comprises a light intensity reducing screen or filter. Scrim 42 may be constructed of a material chosen from but not limited to: metal mesh, plastic mesh, diffused glass, graduated diffused glass, perforated metal plate, perforated metal plate with graduated apertures; and glass, quartz, borosilicate, or borofloat glass, with etched mask layer. The apertures in the plates or glass mask may be circular, linear, tapered slots, or any other shape. The features which distinguish a scrim from a shutter or other flag type are that it reduces the light intensity of the beam passing through it without either completely blocking the light, or affecting the spread and distribution of the light. This usually means that it is well outside the focal plane of the optical systems so that an image of the mesh, apertures, or any other pattern in the scrim is not induced into the beam, instead the scrim produces a reduction of brightness.

Figure 4C:
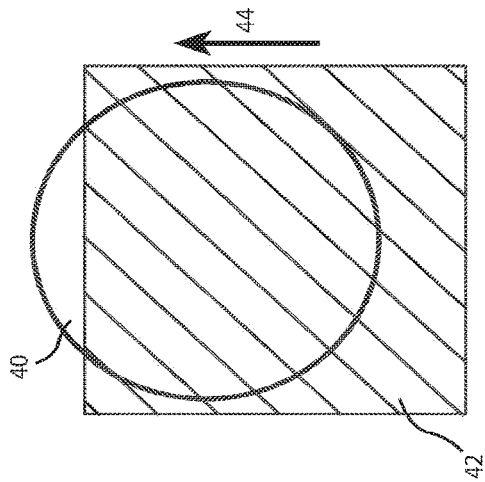
FIG. 4 illustrates schematically the operation of an embodiment of the disclosure.
Figure 4B:
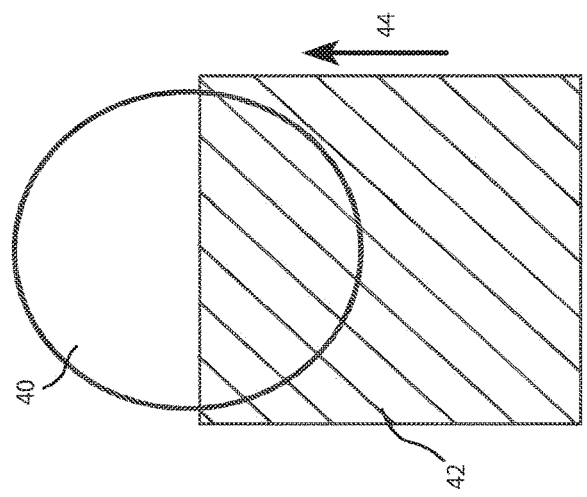
Figure 4A:
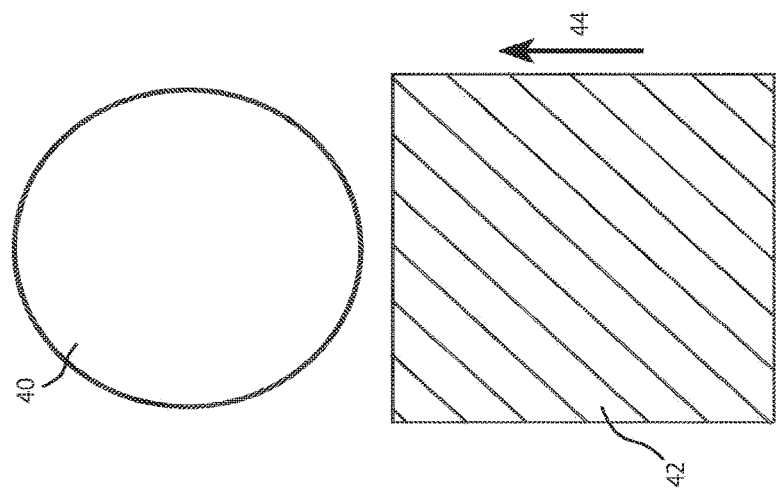

FIG. 4a shows scrim 42 positioned completely outside light beam 40, FIG. 4b shows scrim 42 moved, as shown by arrow 44, so that it partially occludes light beam 40. FIG. 4c shows scrim 42 positioned so as to almost completely occlude light beam 40. In practice scrim 42 may be moved such that any position between zero and 100% occlusion of light beam 40 is possible.

Figure 5C:
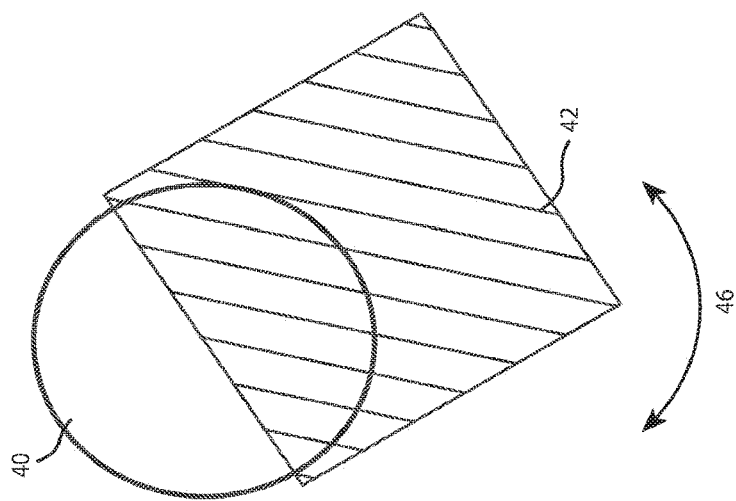
FIG. 5 illustrates schematically a further operation of an embodiment of the disclosure.
Figure 5B:
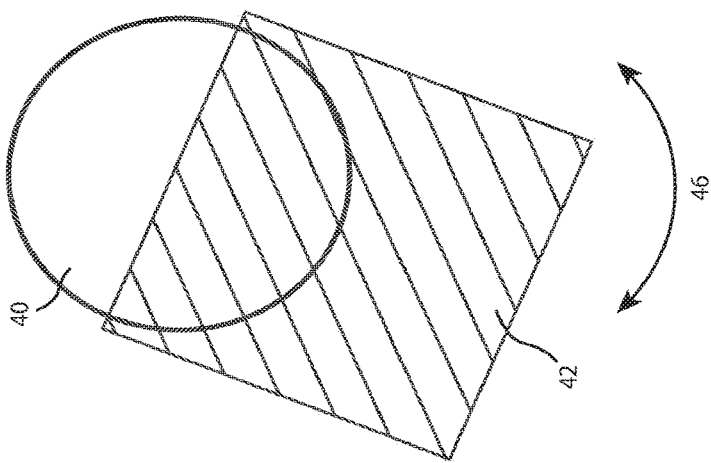
Figure 5A:
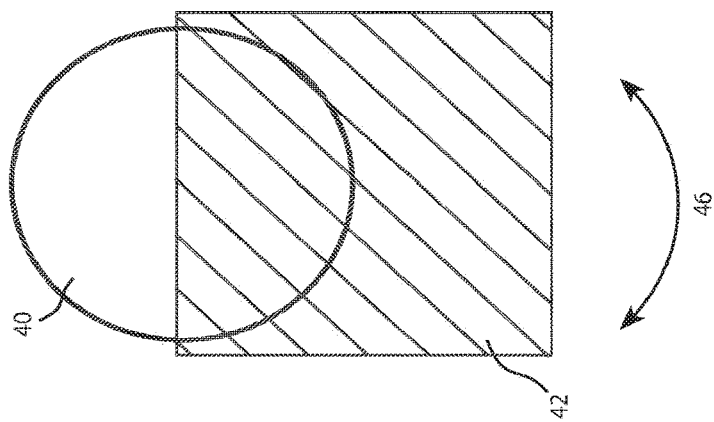

FIG. 5 illustrates schematically a further operation of an embodiment of the disclosure. Once scrim 42 has been moved to occlude at least a portion of light beam 40, it may be rotated, as indicated by arrow 46, to change the angle at which it occludes light beam 40. FIG. 5a shows scrim 42 in a horizontal position, FIG. 5b shows scrim 42 rotated in a first direction, and FIG. 5c shows scrim 42 rotated in an opposing direction. In practice scrim 42 may be rotated to any angle from zero to 360° such that any portion of the light beam 40 may be reduced in intensity by the occlusion of scrim 42.

In a further embodiment, scrim 42 may be capable of continuous rotation around the light beam.

In a further embodiment, scrim 42 may be capable of simultaneous linear positioning and rotation such that any portion of the light beam may be selectively occluded.

In a further embodiment, scrim 42 is mounted to an arm (not shown) such that it enters and moves across the light beam in an arc.

The control of positioning and rotation of scrim 42 may be through stepper motors, servo motors, linear actuators, solenoids, or other movement mechanisms as well known in the art (not shown).

Scrim 42 may have a straight edge, as illustrated herein, or it may have a curved edge, or edge of any shape.

Scrim 42 may be of a consistent optical density across its width and length, or it may vary in optical density across its width, its length, or both.

While the disclosure has been described with respect to a limited number of embodiments, those skilled in the art, having benefit of this disclosure, will appreciate that other embodiments may be devised which do not depart from the scope of the disclosure as disclosed herein. The disclosure has been described in detail, it should be understood that various changes, substitutions and alterations can be made hereto without departing from the spirit and scope of the disclosure.

What is claimed is:

1. A scrim system comprising a scrim, the scrim system being configured to:
   position the scrim in a received light beam, the scrim configured to reduce an intensity of a portion of the received light beam without completely blocking the portion of the received light beam;
   move the scrim a controlled distance into the received light beam;
   rotate the scrim around an optical axis of the received light beam to a controlled angle relative to the received light beam; and
   move the scrim into the received light beam from the controlled angle relative to the received light beam, the controlled angle being independent of the selected distance.

2. The scrim system of claim 1, wherein the controlled angle may be changed without changing the controlled distance.

3. The scrim system of claim 1, wherein the scrim is configured to move into the received light beam along a linear path.

4. The scrim system of claim 1, wherein the scrim is configured to move into the received light beam along an arcuate path.

5. The scrim system of claim 1, wherein the scrim is configured to reduce the intensity of the received light beam passing through the scrim without affecting a spread or a distribution of the received light beam.

6. The scrim system of claim 1, wherein the scrim system is mounted in an optical system of a remotely controlled automated light in a position where the optical system does not project an image of the scrim.

7. The scrim system of claim 1, wherein the scrim includes a straight edge positioned in the received light beam.

8. The scrim system of claim 1, wherein the scrim is configured to fully occlude the received light beam.

9. The scrim system of claim 1, wherein the scrim system is configured to rotate the scrim to any angle relative to the received light beam.

10. The scrim system of claim 1, wherein the scrim system is configured to rotate the scrim continuously around the optical axis of the received light beam.

11. An automated luminaire comprising:
a light source configured to produce a light beam;
a scrim system coupled to the light source, the scrim system comprising a scrim and configured to receive the light beam and position the scrim in the received light beam, the scrim system configured to:
 move the scrim into the received light beam; and
 rotate the scrim around an optical axis of the received light beam; and
control electronics coupled to the scrim system and configured to control the scrim system to:
 move the scrim a controlled distance into the received light beam; and
 rotate the scrim around an optical axis of the received light beam to a controlled angle relative to the received light beam independently of the controlled distance.

12. The automated luminaire of claim 11, wherein the scrim system is configured to rotate the scrim to any angle relative to the received light beam.

13. The automated luminaire of claim 11, wherein the scrim system is configured to rotate the scrim continuously around the optical axis of the received light beam and the control electronics are configured to control the continuous rotation of the scrim.

14. The automated luminaire of claim 11, wherein the control electronics are configured to simultaneously move the scrim into the received light beam and rotate the scrim to the controlled angle relative to the received light beam.

15. The automated luminaire of claim 11, wherein the scrim system is configured to rotate the scrim around the optical axis of the light beam while maintaining the scrim at the selected distance into the received light beam.

16. The automated luminaire of claim 11, wherein the scrim system is configured to move the scrim into the received light beam along a linear path.

17. The automated luminaire of claim 11, wherein the scrim system is configured to move the scrim into the received light beam along an arcuate path.

18. The automated luminaire of claim 11, wherein the scrim is mounted in an optical system of the automated luminaire in a position where the optical system does not project an image of the scrim.

19. The automated luminaire of claim 11, wherein the scrim is configured to reduce an intensity of a portion of the received light beam without completely blocking the portion of the received light beam.

20. The automated luminaire of claim 11, wherein the scrim is configured to reduce an intensity of the received light beam passing through the scrim without affecting a spread or a distribution of the received light beam.

* * * * *